(12) United States Patent
McAndrews

(10) Patent No.: US 7,810,826 B2
(45) Date of Patent: Oct. 12, 2010

(54) BICYCLE SUSPENSION DAMPING SYSTEM

(75) Inventor: Michael McAndrews, Capitola, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 876 days.

(21) Appl. No.: 11/516,679

(22) Filed: Sep. 6, 2006

(65) Prior Publication Data

US 2008/0023935 A1 Jan. 31, 2008

Related U.S. Application Data

(60) Provisional application No. 60/832,731, filed on Jul. 21, 2006.

(51) Int. Cl.
*B60G 13/06* (2006.01)
*B62K 21/20* (2006.01)

(52) U.S. Cl. ............... 280/124.157; 280/276; 280/279

(58) Field of Classification Search .......... 280/124.157, 280/714, 276, 279; 267/217
See application file for complete search history.

(56) References Cited

U.S. PATENT DOCUMENTS

| | | | |
|---|---|---|---|
| 2,717,058 A | 9/1955 | Brundrett | |
| 3,352,387 A | 11/1967 | Powell | |
| 4,203,507 A * | 5/1980 | Tomita et al. | 188/317 |
| 4,624,347 A | 11/1986 | Mourray | |
| 4,795,009 A | 1/1989 | Tanahashi et al. | |
| 5,186,481 A | 2/1993 | Turner | |
| 5,190,126 A | 3/1993 | Curnutt | |
| 5,246,092 A | 9/1993 | Yamaoka | |
| 5,285,875 A | 2/1994 | Munoz | |
| 5,810,128 A | 9/1998 | Eriksson et al. | |
| 5,848,675 A * | 12/1998 | Gonzalez | 188/319.2 |
| 5,957,252 A | 9/1999 | Berthold | |
| 5,996,745 A | 12/1999 | Jones, Jr. et al. | |
| 6,105,988 A | 8/2000 | Turner et al. | |
| 6,116,388 A | 9/2000 | Bataille et al. | |
| 6,120,049 A * | 9/2000 | Gonzalez et al. | 280/276 |
| 6,241,060 B1 * | 6/2001 | Gonzalez et al. | 188/319.2 |
| 6,371,264 B1 | 4/2002 | Deferme | |
| 6,505,719 B2 * | 1/2003 | Gonzalez et al. | 188/319.2 |
| 6,581,948 B2 | 6/2003 | Fox | |
| 6,592,136 B2 | 7/2003 | Becker et al. | |
| 6,604,751 B2 | 8/2003 | Fox | |
| 6,615,960 B1 | 9/2003 | Turner | |
| 6,668,986 B2 | 12/2003 | Moradmand et al. | |
| 6,672,436 B1 | 1/2004 | Keil et al. | |
| 6,868,947 B2 | 3/2005 | Adamek et al. | |
| 7,163,223 B2 * | 1/2007 | Wesling et al. | 280/276 |

(Continued)

*Primary Examiner*—Lesley Morris
*Assistant Examiner*—Daniel Yeagley
(74) *Attorney, Agent, or Firm*—Knobbe, Martens, Olson & Bear, LLP

(57) ABSTRACT

A bicycle including a suspension system operably positioned between the bicycle frame and at least one of the front wheel and rear wheel of the bicycle. The suspension system includes a damping system including a first valve and a second valve, which cooperate to provide desirable damping forces throughout a broad range of relative velocities of the suspension system, while also being relatively lightweight and compact. The first valve includes a first orifice and a first valve body configured to regulate fluid flow through the first orifice. The second valve includes a second orifice. In one arrangement, the second orifice is defined by the first valve body. In another arrangement, the second valve includes a second valve body configured to regulate fluid flow through the second orifice.

26 Claims, 8 Drawing Sheets

U.S. PATENT DOCUMENTS

| | | | |
|---|---|---|---|
| 2001/0009214 A1* | 7/2001 | Tanaka | 188/275 |
| 2003/0213662 A1 | 11/2003 | Fox | |
| 2004/0222056 A1 | 11/2004 | Fox | |
| 2007/0068752 A1* | 3/2007 | Chen | 188/316 |

* cited by examiner

BICYCLE SUSPENSION DAMPING SYSTEM

RELATED APPLICATIONS

This application is related to, and claims priority from, U.S. Provisional Patent Application No. 60/832,731, filed Jul. 21, 2006.

INCORPORATION BY REFERENCE

The entirety of U.S. Provisional Patent Application No. 60/832,731, filed Jul. 21, 2006, is hereby incorporated by reference herein and made a part of the present disclosure.

BACKGROUND OF THE INVENTION

1. Field of the Invention

The present invention generally relates to vehicle suspension systems. More specifically, the present invention relates to an improved suspension damping system to be incorporated into the suspension system of a vehicle, such as a bicycle.

2. Description of the Related Art

Suspension systems, in general, produce both a spring force and a damping force in response to relative movement of movable portions of the suspension system. Suspension damping systems generally produce a damping force that varies with the relative velocity of the movable portions of the damping assembly. A goal in suspension design is to achieve desirable levels of damping force throughout the range of commonly experienced velocities of the suspension system. Attempts to fulfill this goal have met with varying degrees of success and typically include providing multiple damping circuits, each of which are primarily effective over only a portion of the total velocity range.

However, in connection with suspension damping systems applicable to bicycle suspension systems, an overriding design constraint is the relatively small physical space that is available for housing the damping system. In addition, because a bicycle generally is human-powered, another important design constraint is weight. That is, the overall size and weight of usable or marketable bicycle suspension systems are severely restricted in comparison to other vehicles, such as automobiles, for example. Due to such constraints, prior art bicycle suspension damping systems typically provide a desirable level of damping force during only a portion of the entire range of velocity of the suspension system. For example, some prior art bicycle damping systems provide a desirable level of damping force at low velocities but not at high velocities, while other prior art damping systems provide desirable damping force at high velocities but have undesirable characteristics at low velocities. Accordingly, what is needed is an improved bicycle damping system which conforms to the prevailing physical constraints of bicycle suspension systems and also provides a desirable level of damping force throughout a greater range of expected suspension system velocities than the prior art.

SUMMARY OF THE INVENTION

A preferred embodiment is a bicycle including a suspension damping assembly operably positioned between a frame of the bicycle and one of the front wheel and rear wheel of the bicycle. The suspension damping assembly includes a first fluid chamber and a second fluid chamber. A partition separates the first fluid chamber from the second fluid chamber. A first valve comprises a valve body and a first orifice defined by the partition. The first orifice is configured to permit fluid to flow between a first side of the partition and a second side of the partition. The valve body has a first position in which the valve body substantially prevents fluid flow from the first orifice between the partition and the valve body and a second position in which the valve body permits fluid flow from the first orifice between the partition and the valve body. A second valve comprises a second orifice defined by the valve body. The second valve is configured to permit fluid flow from a first side of the valve body to a second side of the valve body.

Another preferred embodiment is a bicycle including a suspension damping assembly operably positioned between a frame of the bicycle and one of the front wheel and rear wheel of the bicycle. The suspension damping assembly includes a first fluid chamber and a second fluid chamber. A partition separates the first fluid chamber from the second fluid chamber. A first valve is configured to permit fluid flow between the first fluid chamber and the second fluid chamber past the partition in a first direction. The first valve includes a first valve body and a first orifice defined by the damping assembly. The first orifice is configured to permit fluid flow between the first fluid chamber and the second fluid chamber. The first valve body is movable in response to fluid pressure between a first position in which the first valve body blocks the first orifice to substantially prevent fluid flow from the first orifice between the partition and the first valve body, and a second position in which the first valve body permits fluid flow from the first orifice between the partition and the first valve body. A second valve is configured to permit fluid flow between the first fluid chamber and the second fluid chamber past the partition in the first direction. The second valve includes a second valve body and a second orifice defined by the damping assembly. The second orifice is configured to permit fluid flow between the first fluid chamber and the second fluid chamber. The second valve body is movable in response to fluid pressure between a first position blocking the second orifice to substantially prevent fluid flow through the second orifice and a second position in which the second valve body permits fluid flow through the second orifice.

Yet another preferred embodiment is a bicycle including a suspension damping assembly operably positioned between a frame of the bicycle and one of the front wheel and rear wheel of the bicycle. The suspension damping assembly includes a first fluid chamber and a second fluid chamber. A partition separates the first fluid chamber from the second fluid chamber. A first valve is configured to permit fluid flow between the first fluid chamber and the second fluid chamber past the partition in a first direction. The first valve is movable between a first position in which fluid flow through the first valve is substantially prevented and a second position in which fluid flow through the first valve is permitted. A second valve is configured to permit fluid flow between the first fluid chamber and the second fluid chamber past the partition in the first direction. The second valve is movable between a first position in which fluid flow through the second valve is substantially prevented and a second position in which fluid flow through the second valve is permitted. The first valve is movable between the first position and the second position when the second valve is in either of the first position or the second position. Further, the second valve is movable between the first position and the second position when the first valve is in either of the first position or the second position.

Still another preferred embodiment is a bicycle including a suspension damping assembly operably positioned between the a frame of the bicycle and one of the front wheel and rear wheel of the bicycle. The suspension damping assembly includes a first fluid chamber and a second fluid chamber. A partition separates the first fluid chamber from the second fluid chamber. A first valve is configured to permit fluid flow between the first fluid chamber and the second fluid chamber past the partition in a first direction. The first valve is movable between a first position in which fluid flow through the first valve is substantially prevented, and a second position in which fluid flow through the first valve is permitted. A second valve is configured to permit fluid flow between the first fluid chamber and the second fluid chamber past the partition in the first direction. The second valve is movable between a first position in which fluid flow through the second valve is substantially prevented, and a second position in which fluid flow through the second valve is permitted. The damping assembly has at least a first mode in which the first valve is in the first position and the second valve is in the first position. The damping assembly has a second mode in which the first valve is in the first position and the second valve is in the second position. In addition, the damping assembly has a third mode in which the first valve is in the second position and the second valve is in the first position.

A further preferred embodiment is a bicycle including a suspension damping assembly operably positioned between a frame of the bicycle and one of the front wheel and rear wheel of the bicycle. The suspension damping assembly includes a tube defining a fluid chamber. A first piston is sealed with an interior surface of the tube and includes a first valve configured to selectively permit fluid flow from a first side of the first piston to a second side of the first piston. A second piston is sealed with an interior surface of the tube. The first and second pistons define a fluid chamber therebetween. The second piston defines a plurality of orifices configured to permit fluid flow from a first side of the second piston to a second side of the second piston. A movable plate is movable between a first position and a second position. In the first position, the plate does not block the plurality of orifices such that fluid flow between the first side of the second piston and the second side of the second piston is permitted at a first flow rate. In the second position, the plate blocks at least one of the plurality of orifices and does not block at least one of the plurality of orifices such that fluid flow between the first side of the second piston and the second side of the second piston is permitted at a second flow rate less than the first flow rate.

BRIEF DESCRIPTION OF THE DRAWINGS

These and other features, aspects and advantages of the present bicycle suspension damping system are described below with reference to drawings of preferred embodiments, which are intended to illustrate, but not to limit, the present invention. The drawings contain ten (10) figures.

FIG. 10 also illustrates a base valve assembly incorporating an inertia valve.

DETAILED DESCRIPTION OF THE PREFERRED EMBODIMENTS

Figure 1:
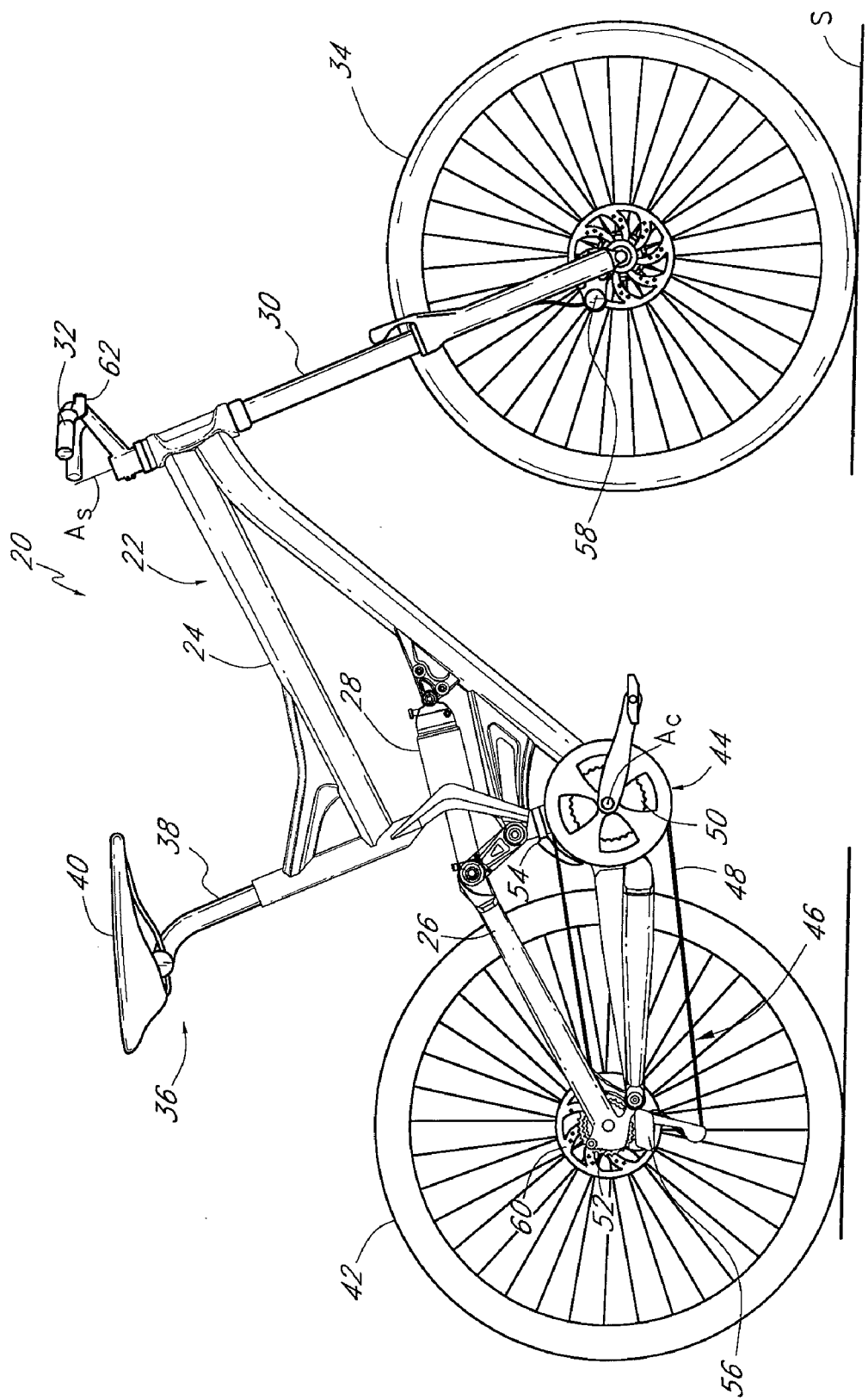
FIG. 1 is an elevational view of a bicycle including a frame, a front wheel and a rear wheel. A front wheel suspension system is operably positioned between the frame and the front wheel and preferably includes a pair of fork legs. A rear wheel suspension system is operably positioned between the frame and the rear wheel.

Preferred embodiments of the present bicycle suspension damping assembly are disclosed herein. Although the disclosed embodiments are well-suited for use in connection with bicycle suspension systems, it is contemplated that the present damping assembly may be adapted for use in other vehicles as well, such as motorcycles, automobiles, snowmobiles and all-terrain vehicles, for example. In addition, the specific embodiments of the damping assembly are often described herein using relative terms, such as "above," "below," "upward," "downward," "axial," and "radial." Such relative terminology is used for the convenience of describing the specific embodiments as oriented in the drawings of the present specification. Accordingly, such relative terms are not intended to limit the scope of the present invention.

FIG. 1 illustrates a bicycle 20 including a frame assembly 22. The bicycle frame assembly 22 includes a main frame 24 and a sub-frame 26. The sub-frame 26 is pivotally supported relative to the main frame 24. A shock absorber 28 extends between the main frame 24 and the sub-frame 26 and preferably is configured to provide both a spring force and a damping force that regulates relative movement between the main frame 24 and sub-frame 26. The spring force tends to lengthen the shock absorber 28 and the damping force attenuates both compression and extension (or rebound) movement of the shock absorber 28.

A forward end of the frame assembly 22 preferably supports a front suspension fork 30 for rotation about a steering axis $A_S$. Similar to the shock absorber 28, the front suspension fork 30 preferably provides both a spring force and a damping force, as is described in greater detail below.

A handlebar assembly 32 is connected to the upper end of the suspension fork 30. A front wheel 34 of the bicycle 20 is rotatably supported by a lower end of the front suspension fork 30. A central, upper portion of the frame assembly 22 supports a bicycle seat assembly 36, including a seat post 38 and a saddle 40.

A rear wheel 42 is rotatably supported by the sub-frame 26 of the frame assembly 22. Thus, the rear wheel 42 is movable, along with the sub-frame 26, relative to the main frame 24. Movement of the rear wheel 42 and sub-frame 26 is regulated by the shock absorber 28.

A lower, central portion of the frame assembly 22 supports a pedal crank assembly 44 for rotation about a crank axis $A_C$. In the illustrated arrangement, the pedal crank assembly 44 is drivingly coupled to the rear wheel 42 by a chain drive transmission 46. The chain drive transmission 46 preferably includes an endless drive chain 48 looped around one of a plurality of variably-sized gears, or chain rings 50, of the pedal crank assembly 44 and one of a plurality of variably-sized gears, or cogs 52, coupled to the rear wheel 42.

A front derailleur 54 is configured to move the drive chain 48 to a selected one of the plurality of front chain rings 50. Similarly, a rear derailleur 56 is configured to move the drive chain 48 to a selected one of the plurality of rear cogs 52. By moving the drive chain 48 between varying combinations of the chain rings 50 and cogs 52, a desired gear ratio may be selected from the plurality of available gear ratios. Although such a multi-speed chain drive arrangement is preferred for its efficiency and reliability, other suitable drive chain arrangements may also be used.

A front brake assembly 58 is configured to apply a braking force to the front wheel 34. Similarly, a rear brake assembly 60 is configured to apply a braking force to the rear wheel 42. Although disc-type brakes are shown, other suitable types of braking systems may also be used, such as cantilever-type brakes, for example. Preferably, rider controls 62 are provided on the handlebar assembly 32 to permit a rider of the bicycle 20 to control the front and rear derailleurs 54, 56 and the front and rear brake assemblies 58, 60.

Figure 2:
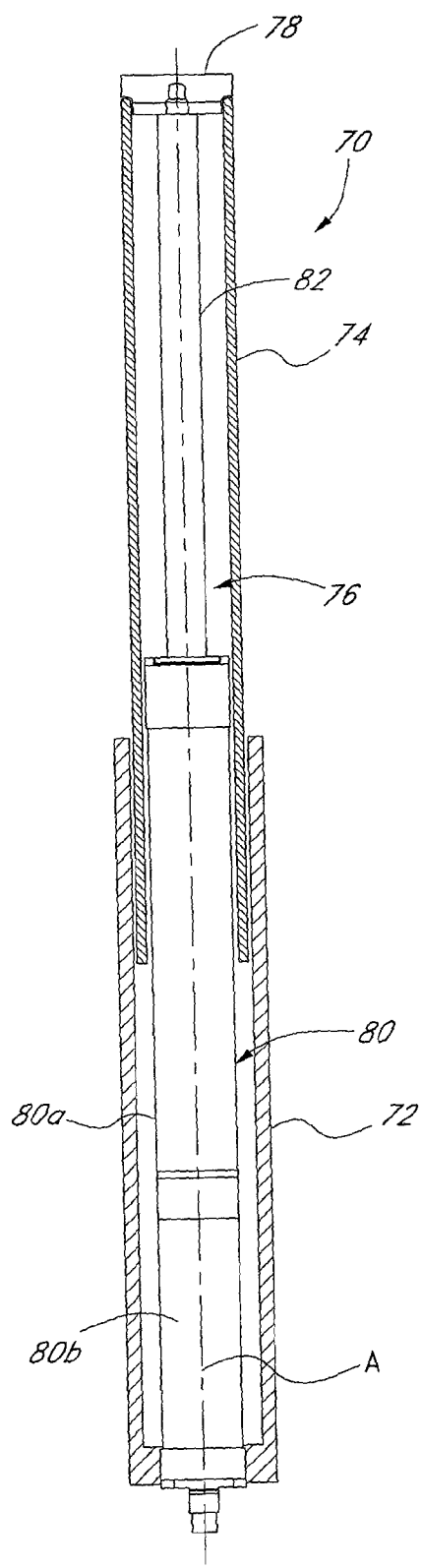
FIG. 2 is a partial cross-sectional view of one fork leg of the front wheel suspension system of FIG. 1. The fork leg of FIG. 2 has fork leg assembly including an outer fork leg and an inner stanchion tube. The fork leg and stanchion are telescopically engaged with one another. A damping assembly is contained within the fork leg.

FIG. 2 illustrates one fork leg assembly 70 of the front suspension fork 30 of FIG. 1. Generally, the front suspension fork 30 will include a pair of fork leg assemblies 70 oriented to straddle the front wheel 34. However, in other arrangements, only one fork leg assembly 70 may be provided, if desired. In addition, other suitable structures may also be employed, such as a linkage-type structure, as will be appreciated by one of skill in the art.

The illustrated fork leg assembly 70 includes an outer tube or fork leg 72, and an inner tube or stanchion 74. The fork leg 72 and the stanchion 74 are telescopically engaged with one another for relative movement along a longitudinal axis A of the fork leg assembly 70. In the illustrated arrangement, the outer tube or fork leg 72 forms a lower end of the fork leg assembly 70, while the stanchion 74 forms the upper end of the fork leg assembly 70. In other arrangements, the relative positions may be reversed, such that the outer tube 72 is positioned relatively above the inner tube 74.

The illustrated fork leg assembly 70 includes a damper assembly 76 positioned within an internal space defined by the fork leg 72 and stanchion 74. The damper assembly 76, as described in greater detail below, preferably is configured to provide a damping force that resists both compression movement and extension (or rebound) movement of the fork leg assembly 70. In addition, preferably the front suspension fork 30 includes a suspension spring (not shown) configured to produce a spring force tending to extend the fork leg assembly 70 and resist compression of the fork leg assembly 70. In some arrangements, the damping system of the front suspension fork 30 may be located in one fork leg assembly 70, while the suspension spring may be located in the other fork leg assembly 70. In alternative arrangements, each fork leg assembly 70 may include both a damper assembly 76 and a suspension spring. The suspension spring may be of any suitable construction, such as a coil spring or air spring arrangement, for example.

The damper assembly 76 preferably extends substantially the entire length of the fork leg assembly 70 and is coupled to both the fork leg 72 and the stanchion 74. The damper assembly 76 may be connected to the fork assembly 70 by any suitable connection. For example, a lower end of the damper assembly 76 may be directly coupled to the fork leg 72. In the illustrated arrangement, the upper end of the damper assembly 76 is connected to the stanchion 74 through a cap 78. The cap 78 may be coupled to both the upper end of the damper assembly 76 and the stanchion 74 by a threaded connection, for example. As will be understood by those of skill in the art, the cap 78 may also include adjustment controls, such as adjustment levers or knobs, which permit adjustment of damping features of the damper assembly 76, which are described in greater detail below.

Figure 3:
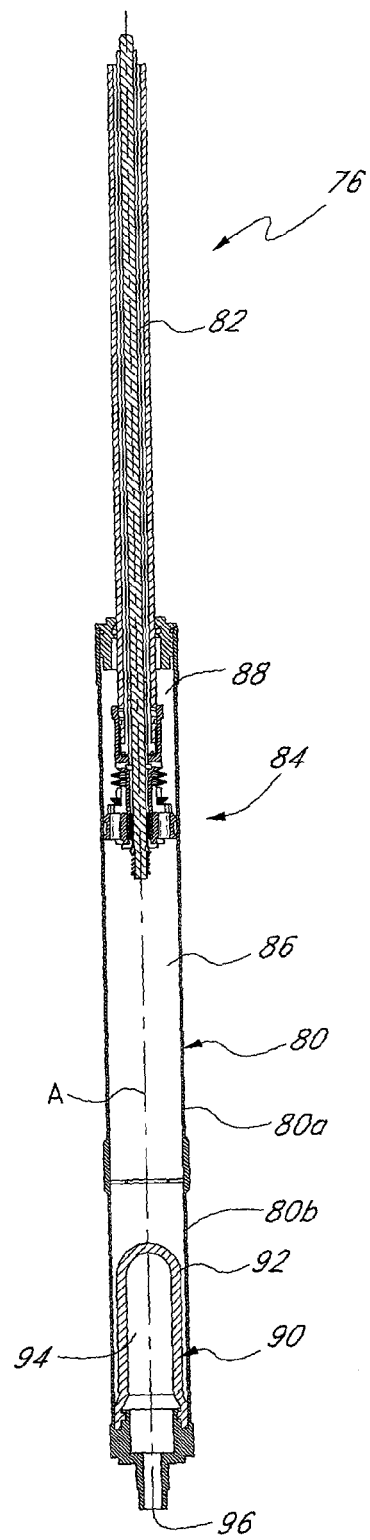
FIG. 3 is a cross-sectional view of the damping assembly of the fork leg of FIG. 2.

With additional reference to FIG. 3, the illustrated damper assembly 76 includes a damper tube 80 and a piston rod 82. The piston rod 82 and damper tube 80 are telescopically engaged with one another for relative compression (i.e., shortening) and extension (i.e., lengthening) movement. As described above, preferably the damper assembly 76 provides a damping force in response to both compression and extension movement between the damper tube 80 and the piston rod 82. The damping force may vary for a given velocity between movement in a compression direction and movement in an extension direction.

As illustrated in FIG. 3, the piston rod 82 carries a damping piston assembly 84 on its lower end within the damper tube 80. The damping piston assembly 84 is in a substantially sealed, sliding engagement with an interior surface of the damper tube 80. Thus, the damping piston assembly 84 divides the interior of the damper tube 80 into a first fluid chamber 86 below the damping piston assembly 84 and a second fluid chamber 88 above the damping piston assembly 84. The fluid chamber 86 reduces in volume in response to compression movement of the damper assembly 76 and is often referred to as the compression chamber. Similarly, the fluid chamber 88 reduces in volume in response to extension or rebound movement of the damper assembly 76 and is often referred to as the rebound chamber.

The damper assembly 76 also includes a compensator 90 which is configured to compensate for displacement of damping fluid within the damper tube 80 by an increasing volume of the piston rod 82 being present within the damper tube 80 as a result of compression of the damper assembly 76. Thus, as the piston rod 82 occupies an increasing volume of the damper tube 80 upon compression, the compensator 90 reduces in volume, thereby increasing the volume of the compression chamber 86 to accommodate fluid that cannot be displaced to the rebound chamber 88.

In the illustrated arrangement, the compensator 90 includes a bladder 92 which separates the compression chamber 86 from a gas chamber 94. The gas within the gas chamber 94 compresses such that the gas chamber 94 is able to reduce in volume to compensate for the damping fluid that cannot be displaced to the rebound chamber 88 during compression of the damper assembly 76.

A valve 96 may be provided to provide access to the gas chamber 94. The gas chamber 94 typically is filled with a pressurized gas, such as nitrogen, for example. Although a bladder-type compensator 90 is illustrated, other suitable constructions may also be used. For example, a floating piston may be provided within the damper 290, which is in sealed, sliding engagement with the interior surface of the damper tube 80 to separate the compression chamber 86 from the gas chamber 94. In addition, if desired, the compensator 90 may be located in a tube other than the damper tube 80. Such reconstruction is referred to as a remote reservoir-type damping assembly.

One advantage of the illustrated construction of the damper assembly 76 is that the damper assembly 76 is a self-contained unit. That is, the damper assembly 76 may be removed from the fork leg 72 and stanchion 74 while remaining intact as a complete assembly. Accordingly, preferably no damping fluid is lost while removing the damper assembly 76 from the remainder of the fork leg assembly 70 thereby easing assembly and disassembly of the fork leg assembly 70. However, in alternative arrangements, fluid from within the damper assembly 76 may communication with an interior space of the fork leg assembly 70, between the fork leg 72 and the damper tube 80. The interior space of the fork leg assembly 70 may be used as a reservoir for displaced damping fluid, as will be appreciated by one of skill in the art.

An additional advantage of the illustrated construction of the damper assembly 76 is that the damper tube 80 includes multiple sections. The illustrated damper tube 80 includes an upper section 80a and a lower section 80b. The upper section 80a defines an entire portion of the interior surface of the damper tube 80 with which the damping piston assembly 84 engages throughout its complete range of relative movement, or suspension travel. Thus, the damping piston assembly 84 does not have to traverse a transition between the sections 80a, 80b, which may damage sealing structures between the damping piston assembly 84 and the damper tube 80.

The lower section 80b defines a portion of the damper tube 80 which houses the compensator 90. As described below, additional features (e.g., a base valve assembly) may be desired within the damper assembly 76 and may be provided within the lower section 80b of the damper tube 80. Thus, the upper section 80a, along with the piston rod 82 and damping piston assembly 84, may comprise a first sub-assembly and the lower section 80b, along with the compensator 90 and/or other desired structures, may comprise a second sub-assembly. Providing separate sub-assemblies allows different upper and lower sections 80a, 80b to be combined together to produce different models of the damper assembly 76 with increased manufacturing flexibility and efficiency.

Figure 4:
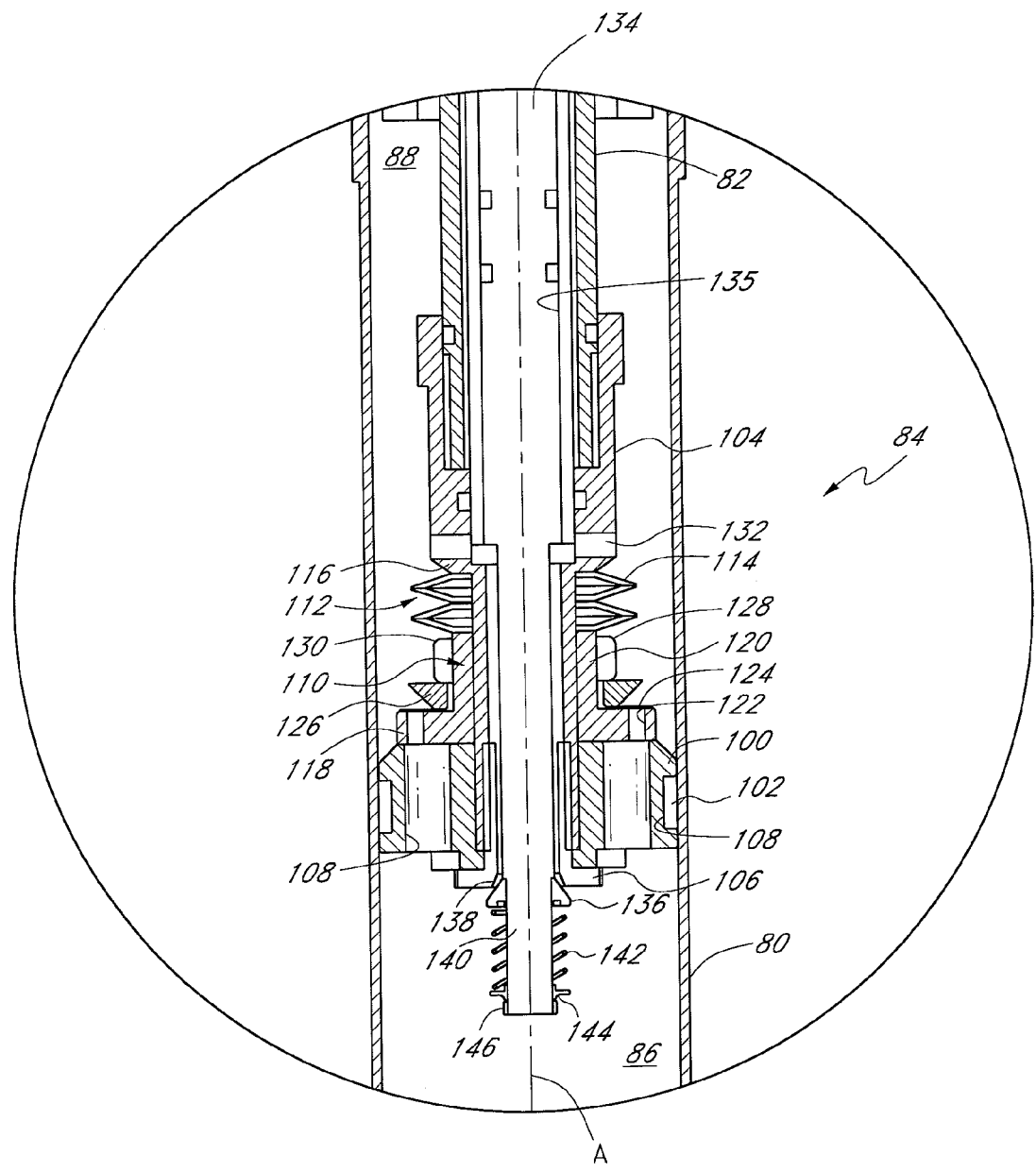
FIG. 4 is an enlarged view of a damping piston arrangement of the damping assembly of FIG. 3.

With reference to FIG. 4, the damping piston assembly 84 includes a damping piston 100. The damping piston 100 is in sealed, slidable engagement with an interior surface of the damper tube 80. A seal member 102 is interposed between a circumferential edge of the piston 100 and the interior surface of the damper tube 80 to create a substantially fluid tight seal between the piston 100 and the damper tube 80. Accordingly, the piston 100 operates as a partition between the compression chamber 86 and the rebound chamber 88.

As is described in detail below, the damping piston assembly 84 includes one or more fluid flow circuits which permit fluid flow between the compression chamber 86 and the rebound chamber 88 in a restricted manner to produce a damping force. Although the illustrated damping piston assembly 84 is supported on the piston rod 82 for movement within the damper tube 80, in other arrangements fluid flow circuits similar to those described below may be provided within a stationary piston, or partition, between the compression chamber or rebound chamber and another fluid chamber, such as a reservoir chamber, for example.

The illustrated piston 100 is supported on a support shaft 104, which extends along an axis of the damper assembly 76. The support shaft 104 is coupled to a lower end of the piston rod 82. The support shaft 104 passes through a central aperture of the piston 100 and includes a shoulder 106 which contacts a bottom surface of the piston 100 and supports the piston 100 from below.

The piston 100 includes one or more compression ports 108 extending axially through the piston 100. The compression ports 108 preferably are orifices in the piston 100 which permit fluid to move through the piston from the compression chamber 86 to the rebound chamber 88. Although two compression ports 108 are shown in FIG. 4, preferably a plurality of compression ports 108 is provided circumferentially around the piston 100. For example, in one arrangement, eight such compression ports 108 may be equally spaced around the circumference of the piston 100.

A valve body, referred to as a compression plate or first valve body 110 herein, is biased toward an upper surface of the piston 100 by a biasing arrangement 112. The biasing arrangement 112 may comprise any suitable type of spring. In the illustrated arrangement, the biasing arrangement 112 is a plurality of disc springs 114, also commonly referred to as Belleville washers. The disc springs 114 are provided in an alternating arrangement between the first valve body 110 and a shoulder 116 of the support shaft 104 such that the smaller diameter ends of the disc springs 114 are adjacent the first valve body 110 and shoulder 116. In the illustrated arrangement, four disc springs 114 are provided. However, in other arrangements, a greater or lesser number of disc springs 114 may be provided, one or more of which may be nested within one another rather than alternating, as shown. In addition, other suitable types of springs may also be used, such as a coil spring, for example.

The first valve body 110 includes a substantially planar, plate-like portion 118 which preferably rests directly against an upper surface of the piston 100. Desirably, the plate portion 118 has an outer diameter of a sufficient size that the plate portion 118 covers the compression ports 108. A tubular shaft portion 120 of the first valve body 110 extends upwardly from the plate portion 118 and is slidably engaged with the support shaft 104 such that the first valve body 110 is configured for movement along the axis A of the piston rod 82 relative to the piston 100.

The plate portion 118 of the first valve body 110 also defines at least one, and preferably a plurality, of orifices or flow ports 122. Desirably, one port 122 is provided for each of the compression ports 108. In addition, desirably, the ports 122 are aligned with the compression ports 108. That is, at least a portion of the port 122 overlaps with the compression port 108. Thus, the associated compression port 108 and port 122 are in fluid communication when the first valve body 110 is positioned against the piston 100. Other arrangements to provide fluid communication between the ports 122 and the compression ports 108 of the piston 100 may also be used, such as an interconnecting channel, for example, a preferred embodiment of which is described below with reference to FIGS. 7 and 8.

The ports 122 are normally closed on their upper ends by a shim 124, or stack comprising multiple shims, which may be referred to herein as a second valve body 124. The shim or shim stack 124 is referred to herein in the singular, but it is to be understood that a stack of multiple shims is also covered by the singular reference, unless otherwise noted. In addition, additional shims or shim stacks discussed herein are referred to in the singular, but also encompass a stack of multiple shims.

Figure 5:
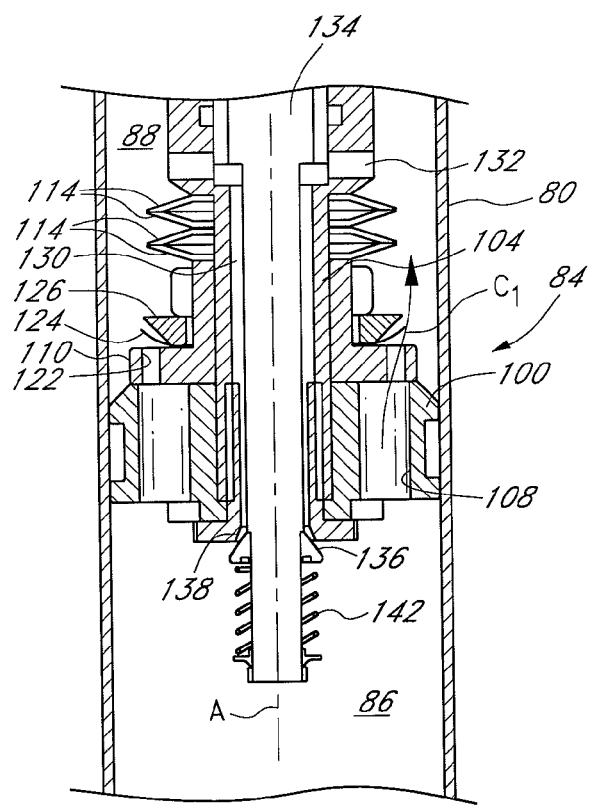
FIG. 5 illustrates one position of the damping piston of FIG. 4.

The shim or second valve body 124 is configured to flex or bend about the axis A, in an upward direction from the first valve body 110, to permit fluid flow through the port 122 in response to a pressure differential sufficient to bend the shim or second valve body 124. The shim or second valve body 124 is held against an upper surface of the plate portion 118 of the first valve body 110 by a retention member, such as a stop 126, which also defines a physical stop surface to limit upward bending movement of the shim or second valve body 124, as illustrated in FIG. 5. Desirably, a retention member, such as a nut 128, is engaged with the shaft portion 120 of the first valve body 110 to retain the shim or second valve body 124 and stop 126 against the upper surface of the plate portion 118 of the first valve body 110.

Figure 6:
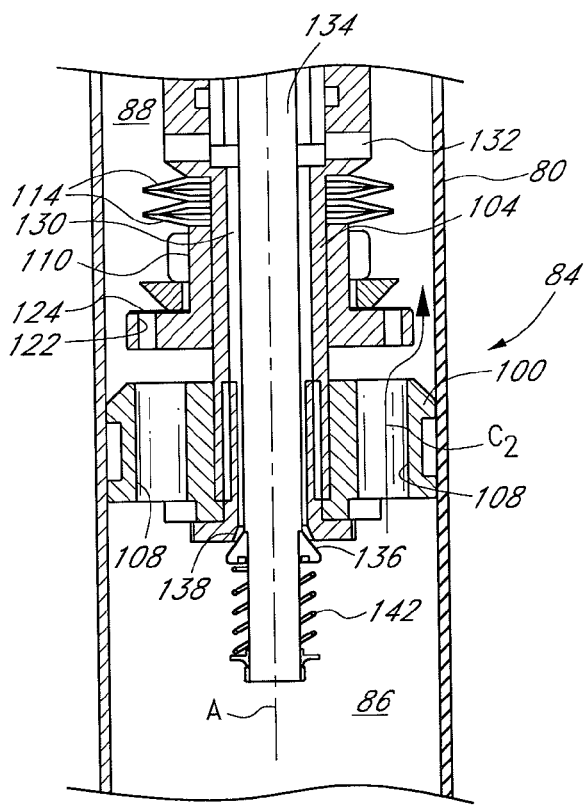
FIG. 6 illustrates another position of the damping piston assembly of FIG. 4.

Desirably, the ports 122 are smaller than the ports 108 such that fluid within the compression ports 108 presses against a portion of the lower surface of the first valve body 110 exposed to the ports 108. Accordingly, if a pressure differential between the compression chamber 86 and the rebound chamber 88 is above a threshold level, the biasing force of the biasing assembly 112 will be overcome such that the first valve body 110 moves upwardly away from the piston 100 to permit fluid flow from the compression ports 108 between the piston 100 and the first valve body 110, as illustrated in FIG. 6.

Desirably, in addition to fluid flow through the piston 100, fluid flow between the compression chamber 86 and the rebound chamber 88 is also permitted through a central passage 130 of the support shaft 104. Desirably, at its lower end, the passage 130 opens directly into the compression chamber 86. At its upper end, the passage 130 communicates with the rebound chamber 88 through one or more radial ports 132. Thus, the central passage 130 and radial ports 132 cooperate to permit fluid flow between the compression chamber 86 and the rebound chamber 88.

Preferably, a one-way valve is provided to permit adjustment of fluid flow through the passage 130 in a compression direction (i.e., from the compression chamber 86 to rebound chamber 88). In the illustrated arrangement, an adjustment shaft 134 extends through a hollow interior passage 135 of the piston rod 82 and through the passage 130 of the support shaft 104. Preferably, the adjustment shaft 134 is connected at its upper end to the cap 78 (FIG. 2) of the fork leg assembly 70 to permit rotation of the shaft 134 relative to the piston rod 82 through a user control device, such as a lever or knob, for example. Preferably, the adjustment shaft 134 is configured such that rotation of the shaft 134 causes translation of the shaft relative to the piston rod 82 along the axis A.

The adjustment shaft 134 carries a valve body 136 that is configured to cooperate with a valve seat 138 defined at the lower end of the passage 130 of the support shaft 104. Thus, the adjustment shaft 134 can be adjusted such that the valve body 136 restricts fluid flow from the compression chamber 86 into the passage 130. Preferably, the valve body 136 is movable to a position relative to the valve seat 138 such that fluid flow from the compression chamber 86 into the passage 130 is completely or substantially completely prevented. Accordingly, a user of the suspension port 30 may adjust the compression characteristics of the damper assembly 76 by causing rotation of the adjustment shaft 134. Those of ordinary skill in the art will appreciate that various possible user adjustment devices, such as knobs or levers, may be employed to permit external rotation of the adjustment shaft 134. In addition, axial movement of the adjustment shaft 134, or valve body 136, may be accomplished by other suitable mechanisms, as well, which may not necessarily require rotation of the adjustment shaft 134.

Desirably, the valve body 136 is in sliding engagement with a reduced diameter portion 140 of the adjustment shaft. A transition between the reduced diameter portion 140 and the remainder of the adjustment shaft 134 above the portion 140 defines a shoulder, which defines an upper limit for movement of the valve body 136, as illustrated by the position of the valve body 136 in FIG. 4. A biasing member, such as a spring 142 is positioned between the valve body 136 and a stop 144 to normally bias the valve body 136 into its uppermost position. The stop 144 may be secured to the reduced diameter portion 140 of the adjustment shaft 134 by a retention member, such as a nut 146. With such an arrangement, fluid pressure within the passage 130 may move the valve body 136 in a downward direction against the biasing force of the spring 142 to permit fluid flow from the rebound chamber 88, past the valve body 136, to the compression chamber 86.

The operation of the illustrated damping piston assembly 84 is described with reference to FIGS. 4 through 6. As illustrated in FIG. 4, when there is no pressure differential between a compression fluid chamber 86 and the rebound fluid chamber 88, or the pressure differential is not sufficient to overcome the biasing force of the shim or second valve body 124, the shim or second valve body 124 remains in a position closing the ports 122 of the first valve body 110. In addition, the first valve body 110 is biased against an upper surface of the piston 100 to close the compression ports 108 of the piston 100. In the illustrated arrangement, the first valve body 110 directly contacts the piston 100 to close off the upper end of the compression ports 108 (along with the shim or second valve body 124). However, in other arrangements, the compression ports 108 may be closed by a member other than the first valve body 110, or the ports 122 may be defined by a member other than the first valve body 110. In other words, the ports 108 and ports 122, along with the structures that close the ports 108 and 122 may be constructed such that they do not share any common components.

With the ports 108 and 122 closed, compression fluid flow from the compression chamber 86 to the rebound chamber 88 may be permitted through the passage 130 of the support shaft 104 and the radial passages 132. As described above, the adjustment shaft 134 may be moved along the axis A to alter a position of the valve body 136 relative to the valve seat 138 to increase or decrease a damping force provided by the damping piston assembly 84 at low compression velocities. Preferably, the adjustment shaft 134 may be adjusted such that the valve body 136 contacts the valve seat 138 to completely or substantially completely prevent fluid flow from the compression chamber 86, through the passage 130 and radial passages 132, to the rebound chamber 88. If the valve body 136 is adjusted to prevent compression fluid flow through the passage 130, compression movement of the damper assembly 76 will be prevented until the pressure differential between the compression chamber 86 and the rebound chamber 88 is sufficient to open the shims or second valve body 124 or move the compression plate first valve body 110.

In addition to compression flow, the aperture 120 and radial ports 132 preferably also permit rebound fluid flow from the rebound chamber 88 to the compression chamber 86. Desirably, the biasing force provided by the spring 142 against the valve body 136 is relatively small such that the valve body 136 may be pushed downwardly by fluid pressure of fluid within the passage 130 to permit fluid flow from the passage 130 into the compression chamber 86 with relatively little resistance provided by the valve body 136. In addition, when the valve body 136 is positioned in contact with the valve seat 138 to substantially prevent compression flow through the passage 130, rebound flow through to the passage 130 may still open the valve body 136 by overcoming the relatively small biasing force provided by the spring 142. Thus, rebound flow through the passage 130 is permitted even when the adjustment shaft 134 is adjusted to substantially prevent compression flow through the passage 130.

With reference to FIG. 5, as described above, when a compression force acting on the damper assembly 76 creates a pressure differential between the compression chamber 86 and the rebound chamber 88 of a threshold magnitude, the shim or second valve body 124 is biased away from the first valve body 110 to permit fluid flow from the compression fluid chamber 86 to the rebound fluid chamber 88 through the ports 122 of the first valve body 110. At relatively low compression velocities (resulting in relatively low pressure differentials), the first valve body 110 remains in a position biased toward the piston 100 such that fluid flow between the compression plate and the piston 100 is completely or substantially completely prevented. In addition to fluid flow through the aperture 122, as illustrated by the arrow $C_1$, fluid flow through the passage 130 and radial ports 132 may also occur.

With reference to FIG. 6, if the pressure differential between the compression chamber 86 and the rebound chamber 88 reaches a threshold differential, the fluid pressure acting on the first valve body 110 and, specifically, the portion of the lower surface of the first valve body 110 exposed to the compression ports 108, causes the first valve body 110 to move upward on the support shaft 104 against the biasing force of the disc springs 114. As a result, fluid flow is permitted from the compression chamber 86 to the rebound chamber 88 through the compression ports 108, as illustrated by the arrow $C_2$. Furthermore, as illustrated in FIG. 6, when the first valve body 110 is lifted away from the piston 100, the fluid pressure within the ports 122 equalizes with the fluid pressure above the shim or second valve body 124 such that the shim or second valve body 124 will move toward its closed position resting against the first valve body 110. As illustrated by the arrow $C_2$, the flow of fluid from the compression chamber 86 to the rebound chamber. 88 passes through the compression port 108 between the piston 100 and the first valve body 110. In the illustrated arrangement, the fluid proceeds to flow in an upward direction between the first valve body 110 and the damper tube 80. However, in other arrangements, other fluid flow paths may be utilized, such as through a passage between the first valve body 110 and support shaft 104. Furthermore, although in the illustrated arrangement the first valve body 110 slides on the support shaft 104, in an alternative arrangement the first valve body 110 may be configured to contact and slide along the interior surface of the damper tube 80 such that fluid flow may occur through an axial passage of the first valve body 110, between the first valve body 110 and support shaft 104, if provided.

As noted above, rebound fluid flow from the rebound chamber 88 to the compression chamber 86 occurs through the radial ports 132 and passage 130. However, if desired, additional rebound fluid circuits may be provided, such as additional ports within the piston 100, for example. Such an arrangement is illustrated in FIG. 8 and described with reference thereto.

With the arrangement as illustrated in FIGS. 2 through 6, the damper assembly 76 is capable of providing a desirable level of damping force over a relatively wide range of compression velocities of the suspension fork 30. Although the shim or second valve body 124 and first valve body 110 are configured to regulate compression fluid flow, in other arrangements, the same or similar elements may be provided to regulate rebound fluid flow in addition wherein the alternative to the illustrated shim or second valve body 124 and first valve body 110. Furthermore, although the damping arrangement 76 has been described in connection with the front suspension fork 30, the rear shock absorber 28 may be constructed to incorporate a damping system similar to the damper assembly 76, as will be appreciated by one of skill in the art.

Figure 7:
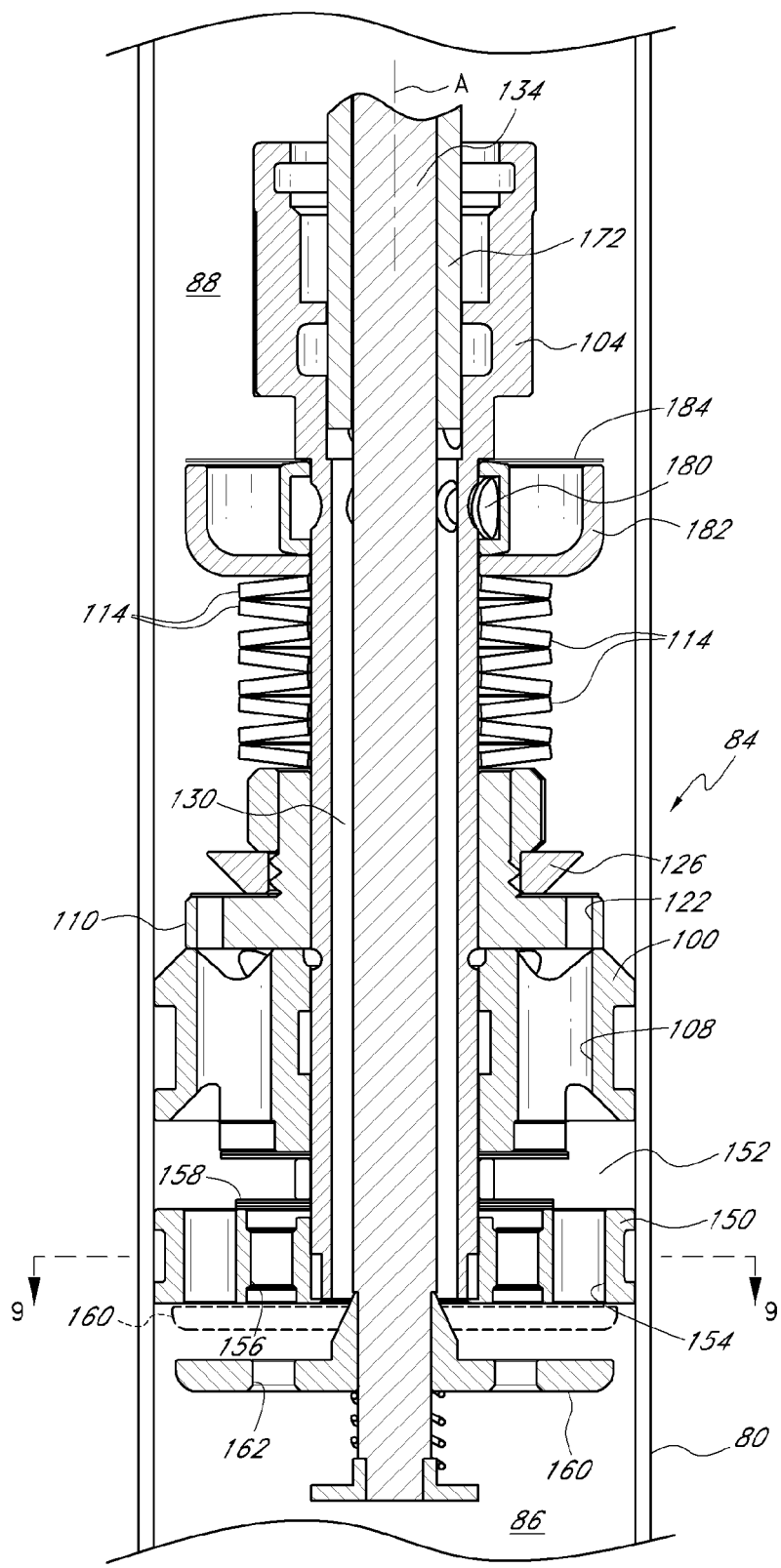
FIG. 7 is a cross-sectional view of a modification of the damping piston arrangement of FIGS. 2-6.
Figure 8:
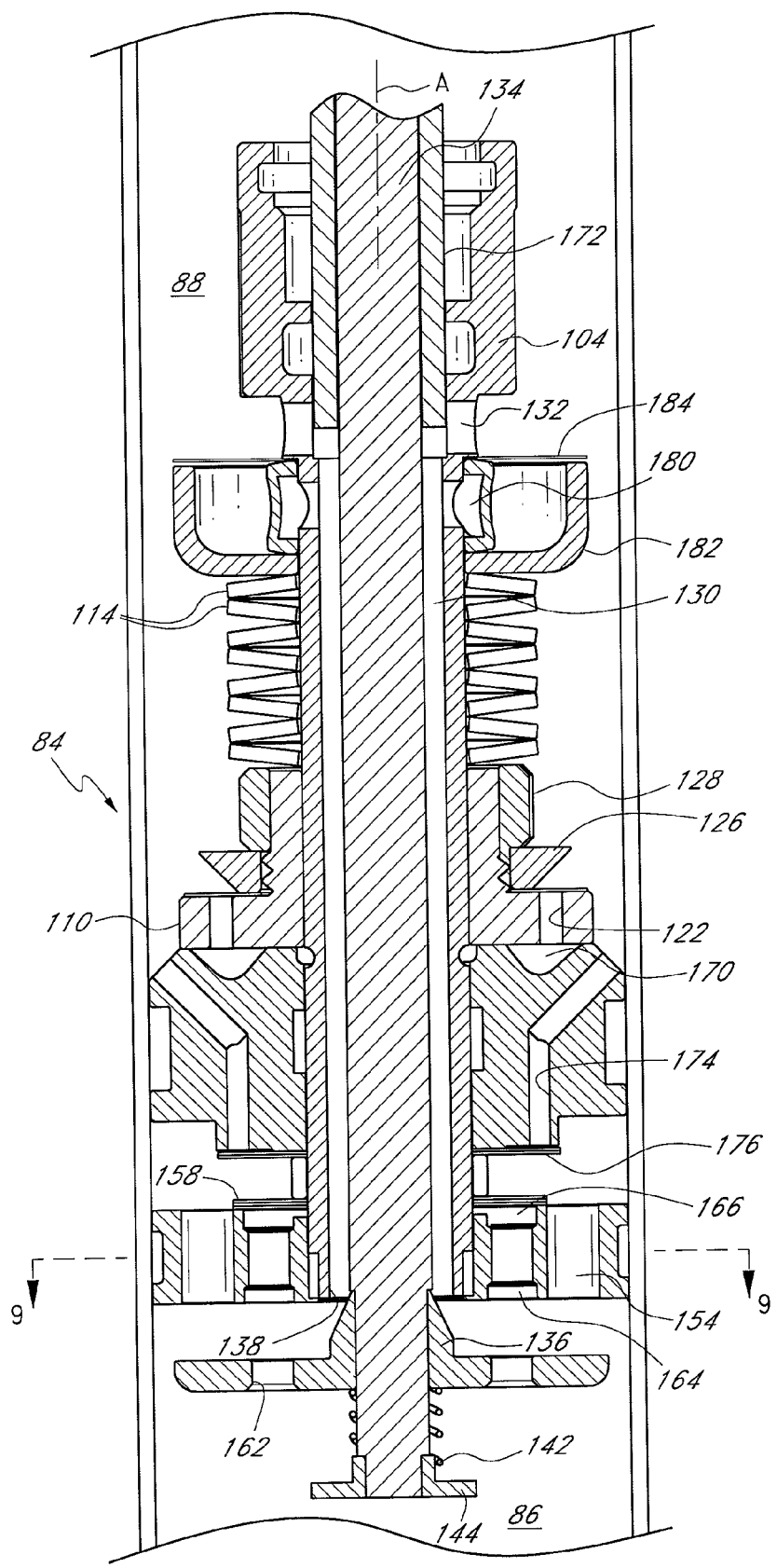
FIG. 8 is another cross-sectional view of the damping piston arrangement of FIG. 7, taken at an angle from the view of FIG. 7.
Figure 9:
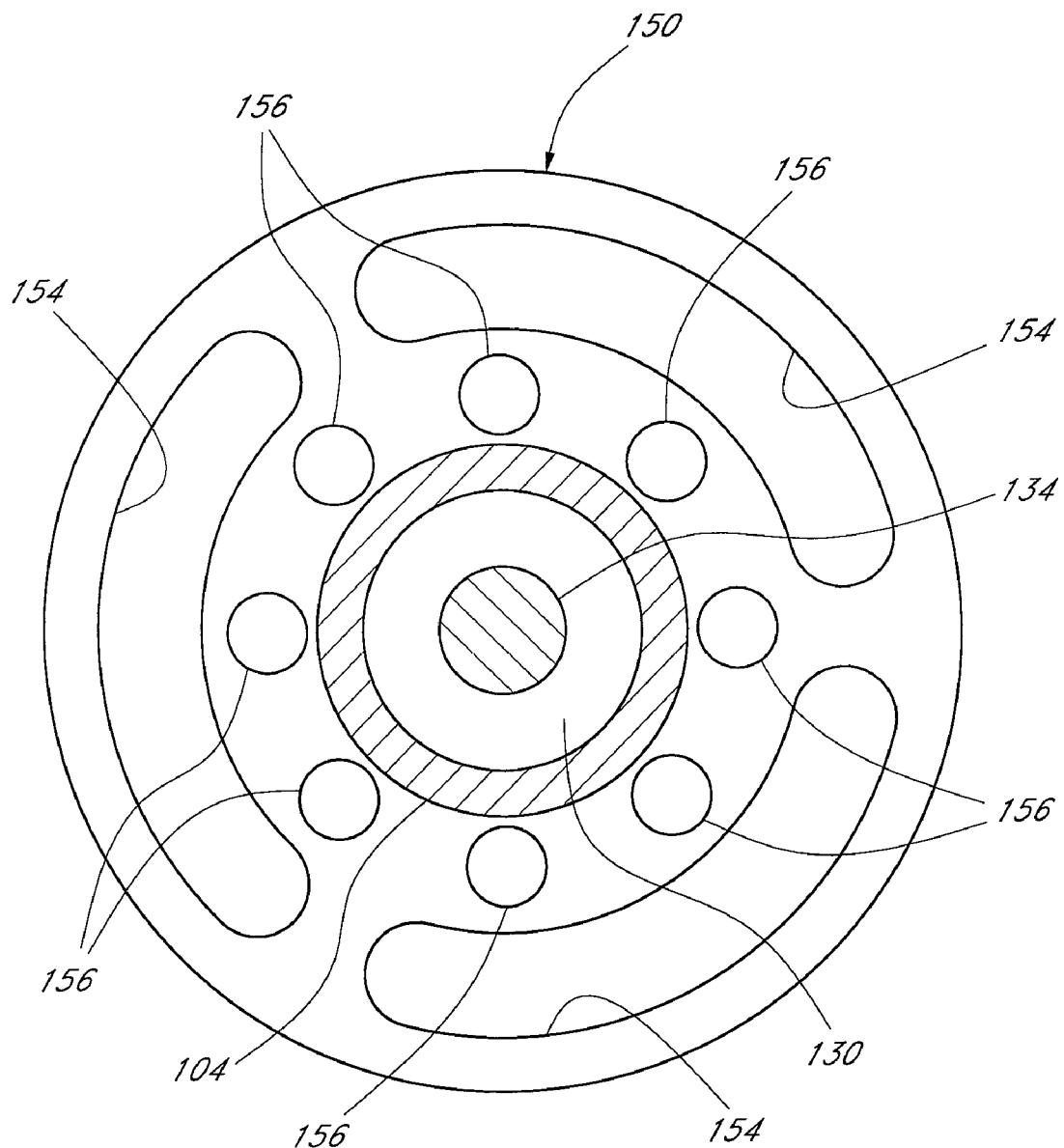
FIG. 9 is a radial cross-sectional view of a secondary piston of the damping piston arrangement of FIGS. 7 and 8, taken along line 9-9 of FIG. 7.

FIGS. 7 through 9 illustrate a modification of the damping piston arrangement 84 of FIGS. 2 through 6. For convenience, the same reference numerals are used in FIGS. 7 and 8 to refer to the same or substantially similar components as those described above in connection with FIGS. 2 through 6. Thus, the damping piston assembly of FIGS. 7 through 9 is generally referred to by the reference numeral 84 and, except as noted below, is structurally and functionally similar to the damping piston arrangement 84 of FIGS. 2 through 6.

Similar to the damping piston assembly 84 of FIGS. 2-6, the damping piston assembly 84 of FIGS. 7 and 8 includes a main piston 100 in slidable engagement with a damper tube 80. The main piston 100 is supported on a support shaft 104, which is carried by a piston rod (not shown). The main piston 100 includes one or more compression ports 108 extending in an axial direction through the piston 100.

A first valve body 110 is biased toward an upper surface of the piston 100 by a biasing arrangement 112, preferably including a plurality of disc spring washers 114. In the illustrated arrangement, the first valve body 110 rests directly on the upper surface of the piston 100. The first valve body 110 also includes one or more ports 122, which extend in an axial direction through the first valve body 110. The ports 122 are closed at an upper end by a shim, or shim stack or second valve body 124. In the illustrated arrangement, the shim or second valve body 124 rests directly against the upper surface of the first valve body 110. A stop 126 retains the shim or second valve body 124 against the first valve body 110. The stop 126 is secured to the first valve body 110 by a retention member, such as a nut 128.

The support shaft 104 defines a central passage 130, which is configured to permit fluid flow between the compression chamber 86 and the rebound chamber 88. Radial ports 132 extend from an upper end of the passage 130 and open into the rebound chamber 88. An adjustment shaft 134 extends through the passage 130 of the support shaft 104 and carries a valve body 136 which is configured to cooperate with a valve seat 138 at a lower end of the passage 130. A spring 142 is supported on a stop 144 and biases the valve body 136 toward its uppermost position relative to the adjustment shaft 134.

In addition, the damping piston assembly 84 of FIGS. 7 and 8 includes a secondary piston 150, which is positioned below the piston 100, also referred to as the "main" piston. The secondary piston 150 is supported by the support shaft 104 and, like the piston 100, is in sliding engagement with an interior surface of the damper tube 80. The secondary piston 150 is spaced along the axis A of the support shaft 104 from the main piston 100 such that a fluid chamber 152 is defined between the main piston 100 and the secondary piston 150. Because the fluid chamber 152 is below the main piston 100, it may be considered as a secondary compression chamber.

The secondary piston 150 includes a first port 154, which extends axially through the secondary piston 150. Preferably, multiple first ports 154 are provided. The secondary piston 150 also includes a second port 156, which extends axially through the piston 150 and is positioned radially inward from the ports 154. Preferably, multiple second ports 156 are provided. An upper end of the ports 156 are closed by one or more shims 158.

With reference to FIG. 9, preferably the first ports 154 are relatively large compared to the second ports 156. In the illustrated arrangement, each of the first ports 154 is elongate and arcuate in shape and extends a substantial distance around a circumference of the piston 150. In the illustrated arrangement, three first ports 154 are provided and, together, extend around substantially the entire circumference of a periphery of the piston 150.

In contrast, each of the second ports 156 preferably are generally circular in shape and significantly smaller than a single one of the first ports 154. In the illustrated arrangement, eight of the second ports 156 are provided. The collective area of the second ports 156 is substantially less than the collective area of the first ports 154. In other arrangements, a greater or lesser number of ports 156 may be provided. In addition, the ports 156 may be shapes other than circular.

In addition, the valve body 136 includes a plate-like portion 160, which is oriented generally parallel to the secondary piston 150. In the illustrated arrangement, the plate-like portion 160 is a unitary structure with the valve body 136. However, in other arrangements, the valve body 136 and the plate 160 may be constructed from separate components.

The plate 160 includes one or more ports 162, which extend axially through the plate 160. Preferably, one port 162 is provided for each of the ports 156 of the secondary piston 150. The ports 162 preferably are in radial alignment with the ports 156 of the secondary piston 150. That is, preferably the ports 162 are located at a radius from the axis A that is the same or of a similar value as the radius of location of the ports 156. In addition, the ports 162 may be in angular alignment with the ports 156. However, in the illustrated arrangement, a lower surface of the secondary piston 150 defines an annular groove 164 which interconnects the ports 156. Accordingly, fluid communication between the ports 162 of the plate 160 and the ports 156 is permitted regardless of the angular alignment between the ports 162 and 156. In addition, an upper surface of the secondary piston 150 defines a similar groove 166 which interconnects upper ends of the ports 156. Thus, the total area of fluid pressure acting on the shim 158 is generally equivalent to the area of the groove 166, as opposed to simply the collective area of the ports 156.

As described above, the plate 160 is movable along with the adjustment shaft 134 toward the lower surface of the secondary piston 150 to a position sufficient to inhibit fluid flow through the ports 154, as illustrated in phantom line in FIG. 7. Preferably, the plate 160 may be positioned against a lower surface of the secondary piston 150 such that fluid flow through the ports 154 is substantially or completely prevented. When the plate 160 is moved to the closed position (as illustrated in phantom line), fluid flow is still permitted through the ports 156. However, the fluid flow area of the collection of ports 156 is significantly less than the fluid flow area of the ports 154. In addition, fluid flow through the ports 156 must overcome the biasing force of the shim 158. As a result, for similar compression velocities of the damping piston arrangement 84 relative to the damper tube 80, a significantly lower flow rate will occur when the plate 160 is in the upper or closed position compared to when it is in the lower or open position. As a result, a damper employing the damping piston arrangement 84 of FIGS. 7 and 8 will provide a significantly larger damping force when the plate 160 is in the closed position compared to when the plate 160 is in the open position. Because the plate 160 (and valve body 136) is movable with the adjustment shaft 134, an external user control device may be provided to permit a user of the suspension fork 30 to move the plate 160 between the open and closed position.

Preferably, an upper surface of the main piston 100 defines an annular groove 170 that is similar to the grooves 164 and 166 of the secondary piston 150. That is, the groove 170 interconnects the plurality of compression ports 108 of the main piston 100. As a result, fluid pressure is applied to the first valve body 110 over an annular area (minus the collective area of the ports 122), rather than at the discrete locations of the ports 108 as in the arrangement of FIGS. 2 through 6. In addition, it is not necessary for the ports 122 to be aligned with the compression ports 108, which provides for simpler manufacturing of the damping piston arrangement 84.

The damping piston arrangement 84 of FIGS. 7 and 8 also includes a mechanism for adjusting fluid flow through the passage 130 of the support shaft 104. Specifically, the illustrated arrangement includes an adjustment sleeve 172, which is coaxially supported on the adjustment shaft 134 within the passage 130. The adjustment sleeve 172 is configured to be adjustable along the axis A to cover a selected portion of the radial ports 132. The adjustment sleeve 172 may be coupled to an upper cap of the fork assembly to permit external adjustment by a user, as described above. Thus, the rebound fluid flow through the passage 130 may be adjusted to alter a rebound damping force produced by the damping piston assembly 84 for a given relative velocity of the piston assembly 84 relative to the damper tube 80.

In addition to rebound fluid flow through the passage 130, the main piston 100 preferably incorporates one or more rebound fluid flow ports 174. A lower end of the ports 174 are normally closed by one or more shims 176. The shims 176 are configured to prevent compression fluid flow through the ports 174, but open in response to rebound fluid flow through the ports 174 above a threshold pressure differential between the rebound chamber 88 and the fluid chamber 152, which in most instances will be substantially the same as the pressure within the compression chamber 86.

In addition to the radial ports 132, an additional set of radial ports 180 permit fluid communication between the passage 130 and the rebound chamber 188. The ports 180 open into a generally bell-shaped housing 182, which is supported on the support shaft 104. An open, upper end of the housing 182 is substantially closed by a shim 184. As illustrated, a slight gap exists between an upper end of the housing 182 and the shim 184. However, if the pressure in the rebound chamber 88 is increased in comparison to the pressure within the housing 82 (and, thus, the pressure within the compression chamber 86), the shim 184 deflects in a downward direction to contact the housing 182 and inhibit or substantially prevent fluid flow from the rebound chamber 88 into the interior of the housing 182. In response to compression fluid flow, the shim 184 deflects in an upward direction to permit fluid flow from the interior of the housing 182 into the rebound chamber 88. Thus, the shim 184 and housing 182 cooperate to form a one-way valve to permit compression fluid flow while inhibiting or at least substantially preventing rebound fluid flow.

Thus, because compression fluid flow through the passage 130 is not restricted by the size of the radial ports 132 that is exposed by the adjustment sleeve 172, due to the large amount of volume flow permitted through the radial ports 180, compression fluid flow through the passage 130 is primarily regulated by the position of the valve body 136 relative to the valve seat 138. In contrast, because the valve body 136 will open against the small biasing force of the spring 142, rebound fluid flow through the passage 130 is regulated primarily by the volume of the radial passages 132 exposed by the adjustment sleeve 172. Accordingly, both compression and rebound fluid flow through the passage 130 may be individually optimized for a given set of riding conditions.

Figure 10:
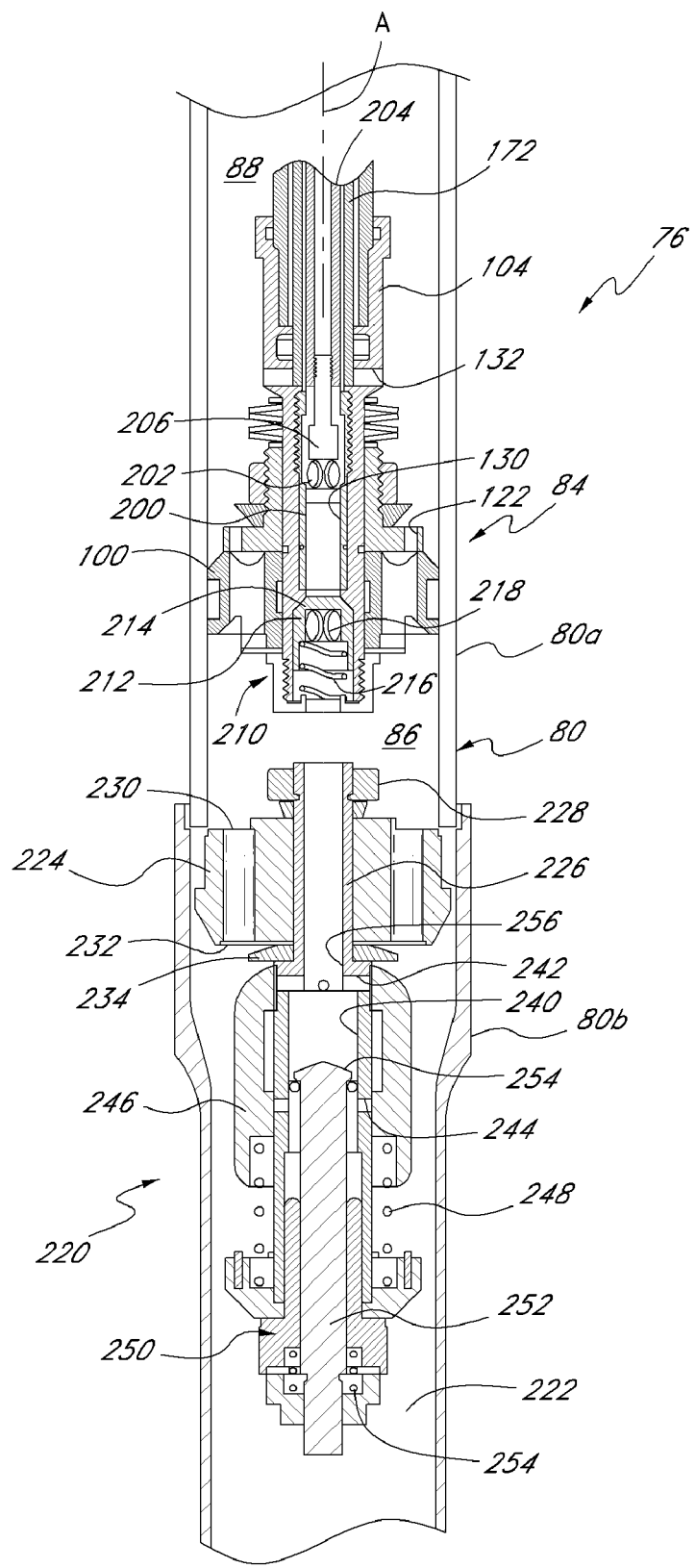
FIG. 10 is a cross-sectional view of yet another modification of the damping piston arrangement of FIGS. 2-6 and 7-9.

FIG. 10 illustrates yet another modification of the damper assembly 76 of FIGS. 2 through 6 and FIGS. 7 through 9. For convenience, similar components in FIG. 10 will be referred to by the same reference numeral as the corresponding components in FIGS. 1 through 9. The damping piston assembly 84 of FIG. 10 is substantially similar to the damping pistons 84 of FIGS. 2 through 6 and the damping piston assembly 84 of FIGS. 7 through 9. However, the damping piston assembly 84 of FIG. 10 includes additional rebound damping adjustment mechanisms.

The support shaft 104 of the damping piston assembly 84 of FIG. 10 includes a central passage 130 which communicates with the rebound chamber 88 through radial ports 132. An adjustment sleeve 172 is positioned within the passage 130 of the support shaft 104 and may be moved along the axis A of the damper assembly 76 to vary the area of the radial ports 132 exposed to the central passage 130. Desirably, the adjustment sleeve 172 is capable of completely or substantially completely closing off the radial ports 132 from the central passage 130.

In addition, a secondary sleeve 200 is positioned within the central passage 130 of the support shaft 104. Preferably, the secondary sleeve 200 occupies an intermediate portion of the central passage 130 and fits snugly against the interior surface of the support shaft 104. The sleeve 200 defines one or more ports 202 extending radially through an upper end portion of the sleeve 200.

A secondary rebound adjustment rod 204 extends through the interior of the adjustment sleeve 172. A valve body 206 is carried on the lower end of the adjustment rod 204. In the illustrated arrangement, the valve body 206 is defined by a machine screw and, specifically, by a head portion of the machine screw. The machine screw is threadably engaged with the secondary adjustment rod 204. The head of the machine screw 206 is positioned within an upper end of the sleeve 200. The head of the machine screw 206 is sized to occupy a substantial portion of the hollow interior of the sleeve 200, but to still permit fluid flow between the head of the machine screw 206 and the interior surface of the sleeve 200.

The adjustment rod 204 is configured to move along the axis A such that the head of the machine screw 206 may be adjusted to block a desired portion of the ports 202. Accordingly, adjustment of the amount of fluid flow permitted from the rebound chamber 88 through the radial ports 132 and past the machine screw 206 into a lower portion of the central passage 130 of the support shaft 104 is permitted. The adjustment rod 204 may be coupled to a user control at the cap 78 (FIG. 2) of the fork leg 70 to permit external adjustment of the position of the adjustment rod 204 and, thus, the machine screw 206 relative to the ports 202. Furthermore, although not specifically illustrated, the damping piston arrangement 84 of FIG. 10 preferably includes rebound specific flow circuit through the main piston 100 similar to the rebound ports 174 and shim 176 illustrated in FIGS. 7 and 8.

A one way valve 210 closes a lower end of the central passage 130. The valve 210 includes a valve body 212 biased against a valve seat 214 by a biasing member, such as a spring 216. The valve body includes one or more ports 218 extending radially through a side wall of the valve body 212. Accordingly, fluid pressure within the central passage 130 may overcome the biasing force of the spring 216 to move the valve body 212 in a downward direction away from the valve seat 214 such that fluid flow is permitted from the central passage 130 through the ports 218 and into the compression chamber 86. In contrast, fluid pressure in the compression chamber 86 tends to push the valve body 212 more tightly against the valve seat 214 such that compression fluid flow through the central passage 130 is substantially or completely prevented.

In addition, the damping assembly 76 of FIG. 10 includes an inertia valve 220, which is configured to, at least in part, regulate fluid flow from the compression chamber 86 to a reservoir chamber 222. The reservoir chamber 222 is separated from the compression chamber 86 by a partition, or a piston 224. Specifically, the piston 224 is disposed in the upper end of a lower portion 80b of the damper tube 80. As described above, the lower portion 80b of the damper tube 80 is secured to the upper portion 80a of the damper tube 80. Thus, the damper tube 80 is in two sections, 80a and 80b, which permits the lower portion 80b to be varied depending upon whether an inertia valve 220 is desired for a particular model fork, as described above. As a result, the efficiency of the manufacturing process for producing the fork leg 70 is enhanced.

A shaft 226 is supported within a central aperture of the piston 224 and is secured to the piston 224 by a nut 228. The shaft 226 extends in a downward direction from the piston 224 and supports the inertia valve 220, as is described in greater detail below.

The piston 224 includes axially-extending ports 230, the lower ends of which are closed a shim 232. Thus, the ports 230 and shim 232 create a one-way valve which permits fluid flow from the compression chamber 86 to the reservoir chamber 222, but substantially or completely prevents fluid flow from the reservoir chamber 222 to the compression chamber 86. A stop 234 defines a stop surface that defines an open position of the shim 232.

Preferably, the piston 224 includes an additional one-way valve structure which permits fluid flow from the reservoir chamber 222 to the compression chamber 86 upon rebound movement of the damping assembly 76. Such a one-way valve is desirable to permit fluid which has been displaced to the reservoir chamber 222 during compression of the damper assembly 76 to be able to return to the compression chamber 86 upon subsequent rebound motion. Such a one-way rebound valve may be constructed of rebound ports and a rebound shim closing an upper end of the rebound ports similar to the ports 230 and shim 232, as will be appreciated by one of skill in the art. In addition, other suitable structures to permit refill flow from the reservoir chamber 222 to the compression chamber 86 may also be used.

The shaft 226 includes a central passage 240 which extends axially along the shaft 226. The shaft 226 defines an upper set of ports 242 extending radially through the shaft 226 and a lower set of ports 244 extending radially through the shaft 226. An inertia mass 246 is biased into an upward position against the stop 234 by a biasing member, such as a spring 248, such that the inertia mass 246 normally blocks the ports 242 and 244. Upon upward acceleration of the damper tube 80, the inertia mass 246 tends to resist movement such that the damper tube and inertia valve shaft 226 move upwardly relative to the inertia mass 246. Looked at from another perspective, in response to upward acceleration of the damper tube 80, the inertia mass 246 moves relatively downward on the shaft 226, overcoming the biasing force of the spring 248, to expose the ports 242 and 244. Thus, fluid flow is permitted from the compression chamber 86 into the reservoir chamber 222 through the inertia valve 220 in addition to the compression fluid flow permitted by the compression ports 230 of the piston 224. Accordingly, when a significant bump is encountered, the inertia valve 220 opens to permit additional fluid flow and reduce the damping force provided by the damping assembly 76. However, in response to downward movement of the damper tube 80, the inertia valve 220 remains closed. Accordingly, downward directed forces, such as rider induced forces, do not open the inertia valve 220, such that the fork 30 tends to resist compression in response to rider-induced forces.

Preferably, flow through the ports 242 and 244 are also controlled by a pressure regulated valve assembly 250. The valve 250 includes a valve body 252 normally biased by a biasing member, such as a spring 254, into an upward position such that an upper surface 254 of the valve body 252 contacts a valve seat 256 defined by the shaft 226 to close off the ports 242 and 244. The valve body 252 is movable in a downward direction in response to fluid pressure from the compression chamber 86 to open one or both sets of ports 242, 244. Thus, with the illustrated arrangement, both a sufficient upward acceleration of the damper tube 80 and a sufficient pressure differential between the compression chamber 86 and the reservoir chamber 222 are necessary to permit fluid flow through the ports 242 and 244.

As will be appreciated by one of skill in the art, the inertia valve 220 and pressure regulated valve 250 may be combined with the damping piston assemblies 84 of FIGS. 2 through 6 or 7 through 9, instead of the damping piston assembly 84 of FIG. 10. In addition, although not specifically illustrated in FIG. 10, preferably a volume compensation device (similar to the compensator 90 of FIG. 2) is provided to compensate for an increasing volume of the piston rod that occupies the damper tube 80 during compression movement. The volume compensation device may be positioned below the inertia valve 220 and pressure regulated valve 250.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present bicycle damping system has been described in the context of particularly preferred embodiments, the skilled artisan will appreciate in view of the present disclosure that certain advantages, features, and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A bicycle, comprising:
a front wheel;
a rear wheel;
a frame;
a suspension assembly operably positioned between said frame and one of said front wheel and said rear wheel, said suspension assembly comprising:
a first fluid chamber;
a second fluid chamber;
a first partition separating said first fluid chamber from said second fluid chamber;
a first valve configured to permit fluid flow between said first fluid chamber and said second fluid chamber past said first partition, said first valve comprising (1) a first orifice defined by said first partition and (2) a first valve body comprising a slidable member, said first orifice configured to permit fluid flow between said first fluid chamber and said second fluid chamber, said first valve body movable in response to fluid pressure between a first position in which said first valve body blocks said first orifice to substantially prevent fluid flow from said first orifice between said first partition and said first valve body and a second position in which said first valve body permits fluid flow from said first orifice between said first partition and said first valve body;
a second valve configured to permit fluid flow between said first fluid chamber and said second fluid chamber past said first partition, said second valve comprising (1) a second orifice defined by said first valve body and (2) a second valve body on an opposite side of said first valve body from said first partition, said second orifice configured to permit fluid flow between said first fluid chamber and said second fluid chamber, said second valve body movable in response to fluid pressure between a first position blocking said second orifice to substantially prevent fluid flow through said second orifice and a second position in which said second valve body permits fluid flow through said second orifice;
wherein said first valve and said second valve are both configured to selectively permit fluid flow in a first direction from said first fluid chamber to said second fluid chamber.

2. The bicycle of claim 1, wherein said second valve further comprises a stop, wherein said second valve body contacts said stop in said second position.

3. The bicycle of claim 1, wherein said second valve body comprises a shim, an outer annular portion of said shim configured to flex to move to said second position.

4. The bicycle of claim 3, wherein said shim is carried by said first valve body.

5. The bicycle of claim 3, wherein an inner annular portion of said shim is fixed against said first valve body.

6. The bicycle of claim 1, further comprising a second partition spaced from said first partition, said second partition comprising at least one orifice configured to permit fluid flow through said second partition.

7. The bicycle of claim 6, further comprising a plate configured to be movable between a first position substantially preventing fluid flow through said at least one orifice of said second partition and a second position permitting fluid flow through said at least one orifice of said second partition.

8. The bicycle of claim 1, wherein said first partition is a piston carried by a piston rod movable relative to a tube that at least partially defines at least one of said first fluid chamber and said second fluid chamber.

9. The bicycle of claim 8, wherein all of a damping fluid of said suspension assembly is contained within said tube.

10. The bicycle of claim 1, further comprising a third fluid chamber and an inertia valve, said inertia valve responsive to acceleration forces directed along a longitudinal axis of said suspension assembly and configured to regulate fluid flow between said third fluid chamber and one of said first fluid chamber and said second fluid chamber.

11. A bicycle, comprising:
a front wheel;
a rear wheel;
a frame;
a suspension assembly operably positioned between said frame and one of said front wheel and said rear wheel, said suspension assembly comprising:
a first fluid chamber;
a second fluid chamber;
a first partition separating said first fluid chamber from said second fluid chamber;
a first valve comprising (1) a first orifice defined by said first partition and (2) a first valve body comprising a slidable member, said first valve configured to permit fluid flow between said first fluid chamber and said second fluid chamber past said first partition, said first valve body movable between a first position in which fluid flow through said first valve is substantially prevented and a second position in which fluid flow through said first valve is permitted; and a second valve comprising (1) a second orifice defined by said first valve body and (2) a second valve body on an opposite side of said first valve body from said first partition, said second valve configured to permit fluid flow between said first fluid chamber and said second fluid chamber past said first partition, said second valve movable between a first position in which fluid flow through said second valve is substantially prevented and a second position in which fluid flow through said second valve is permitted;

wherein said first valve is movable between said first position and said second position when said second valve is in either of said first position or said second position and wherein said second valve is movable between said first position and said second position when said first valve is in either of said first position or said second position, wherein said first valve and said second valve are both configured to selectively permit fluid flow in a first direction from said first fluid chamber to said second fluid chamber.

12. The bicycle of claim 11, further comprising a second partition spaced from said first partition, said second partition comprising at least one orifice configured to permit fluid flow through said second partition.

13. The bicycle of claim 12, further comprising a plate configured to be movable between a first position substantially preventing fluid flow through said at least one orifice of said second partition and a second position permitting fluid flow through said at least one orifice of said second partition.

14. The bicycle of claim 11, wherein said first partition is a piston carried by a piston rod movable relative to a tube that at least partially defines at least one of said first fluid chamber and said second fluid chamber.

15. The bicycle of claim 14, wherein all of a damping fluid of said suspension assembly is contained within said tube.

16. The bicycle of claim 11, further comprising a third fluid chamber and an inertia valve, said inertia valve responsive to acceleration forces directed along a longitudinal axis of said suspension assembly and configured to regulate fluid flow between said third fluid chamber and one of said first fluid chamber and said second fluid chamber.

17. The bicycle of claim 11, wherein said second valve body comprises an annular shim, wherein an inner portion of said shim is fixed against said first valve body and an outer portion of said shim is configured to flex away from said first valve body to move to said second position.

18. A bicycle, comprising:
a front wheel;
a rear wheel;
a frame;
a suspension assembly operably positioned between said frame and one of said front wheel and said rear wheel, said suspension assembly comprising:
a first fluid chamber;
a second fluid chamber;
a first partition separating said first fluid chamber from said second fluid chamber;
a first valve comprising (1) a first orifice defined by said first partition and (2) a first valve body comprising a slidable member, said first valve configured to permit fluid flow between said first fluid chamber and said second fluid chamber past said first partition, said first valve body movable between a first position in which fluid flow through said first valve is substantially prevented and a second position in which fluid flow through said first valve is permitted; and a second valve comprising (1) a second orifice defined by said first valve body and (2) a second valve body on an opposite side of said first valve body from said first partition, said second valve configured to permit fluid flow between said first fluid chamber and said second fluid chamber past said first partition, said second valve movable between a first position in which fluid flow through said second valve is substantially prevented and a second position in which fluid flow through said second valve is permitted;

wherein said first valve and said second valve are both configured to selectively permit fluid flow in a first direction from said first fluid chamber to said second fluid chamber and said suspension assembly has at least a first mode in which said first valve is in said first valve first position and said second valve is in said second valve first position, a second mode in which said first valve is in said first valve first position and said second valve is in said second valve second position, and a third mode in which said first valve is in said first valve second position and said second valve is in said second valve first position.

19. The bicycle of claim 18, further comprising a secondary partition spaced from said first partition, said secondary partition comprising at least one orifice configured to permit fluid flow through said secondary partition.

20. The bicycle of claim 19, further comprising a plate configured to be movable between a first position substantially preventing fluid flow through said at least one orifice of said secondary partition and a second position permitting fluid flow through said at least one orifice of said secondary partition.

21. The bicycle of claim 18, wherein said first partition is a piston carried by a piston rod movable relative to a tube that at least partially defines at least one of said first fluid chamber and said second fluid chamber.

22. The bicycle of claim 21, wherein all of a damping fluid of said suspension assembly is contained within said tube.

23. The bicycle of claim 18, further comprising a third fluid chamber and an inertia valve, said inertia valve responsive to acceleration forces directed along a longitudinal axis of said suspension assembly and configured to regulate fluid flow between said third fluid chamber and one of said first fluid chamber and said second fluid chamber.

24. The bicycle of claim 18, wherein said second valve body comprises an annular shim, wherein an inner portion of said shim is fixed against said first valve body and an outer portion of said shim is configured to flex away from said first valve body to move to said second vale second position.

25. A bicycle, comprising:
a front wheel;
a rear wheel;
a frame;
a suspension assembly operably positioned between said frame and one of said front wheel and said rear wheel, said suspension assembly comprising:
a first fluid chamber;
a second fluid chamber;
a first partition separating said first fluid chamber from said second fluid chamber;
a first valve configured to permit fluid flow between said first fluid chamber and said second fluid chamber past said first partition in a first direction, said first valve comprising a first valve body and a first orifice defined by said first partition, said first orifice configured to permit fluid flow between said first fluid chamber and said second fluid chamber, said first valve body comprising a slidable member and movable in response to fluid pressure between a first position in which said first valve body blocks said first orifice to substantially prevent fluid flow from said first orifice between said first partition and said first valve body and a second position in which said first valve body permits fluid flow from said first orifice between said first partition and said first valve body;

a second valve configured to permit fluid flow between said first fluid chamber and said second fluid chamber past said first partition in said first direction, said second valve comprising a second valve body on an opposite side of said first valve body from said first partition and a second orifice defined by said first valve body, said second orifice configured to permit fluid flow between said first fluid chamber and said second fluid chamber, said second valve body movable in response to fluid pressure between a first position blocking said second orifice to substantially prevent fluid flow through said second orifice and a second position in which said second valve body permits fluid flow through said second orifice, and wherein said first orifice and said second orifice are aligned.

26. The bicycle of claim 25, wherein a flow area of said first orifice is larger than a flow area of said second orifice.

* * * * *